United States Patent
Remmlinger

(10) Patent No.: US 7,379,807 B2
(45) Date of Patent: May 27, 2008

(54) METHOD FOR HANDLING CONTROL DATA FOR AN ELECTRONIC CONTROL DEVICE OF AN AUTOMATIC TRANSMISSION

(75) Inventor: Ulrich Remmlinger, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 612 days.

(21) Appl. No.: 10/966,683

(22) Filed: Oct. 15, 2004

(65) Prior Publication Data

US 2005/0085978 A1    Apr. 21, 2005

(30) Foreign Application Priority Data

Oct. 21, 2003  (DE) ................................ 103 48 754

(51) Int. Cl.
*G06F 7/00*  (2006.01)

(52) U.S. Cl. ............................ 701/51; 701/35; 701/53; 701/54; 477/34

(58) Field of Classification Search ............ 701/51–54, 701/84, 35; 477/34, 54
See application file for complete search history.

(56) References Cited

U.S. PATENT DOCUMENTS 5,091,856 A * 2/1992 Hasegawa et al. ............ 701/36
5,377,111 A   12/1994 Takahashi et al.
6,155,948 A   12/2000 Gierer

FOREIGN PATENT DOCUMENTS

DE        43 02 248 A1   7/1993
DE        196 43 305 A1  4/1998

* cited by examiner

*Primary Examiner*—Gertrude Arthur Jeangla
(74) *Attorney, Agent, or Firm*—Davis Bujold & Daniels, P.L.L.C.

(57) ABSTRACT

Within the scope of the method for transfer of characteristic quantities or characteristic lines of an automatic transmission from the final test stand or transmission acceptance test stand to an electronic control, especially to the engine control, the characteristic quantities or characteristic lines of the final test stand or transmission acceptance test stand are recorded or stored on a portable data carrier clearly coordinated with the transmission so that at a later point in time the data can be read in and programmed in the engine control.

11 Claims, 1 Drawing Sheet

METHOD FOR HANDLING CONTROL DATA FOR AN ELECTRONIC CONTROL DEVICE OF AN AUTOMATIC TRANSMISSION

This application claims priority from German Application Serial No. 103 48 754.9 filed Oct. 21, 2003.

FIELD OF THE INVENTION

The invention relates to a method for transfer of characteristic quantities or characteristic lines of an automatic transmission to an electronic control. Transmissions can be multi-step transmission or also continuously variable transmissions (CVT).

BACKGROUND OF THE INVENTION

In automatic transmissions, according to the prior art, the functional relationship between pressure regulating current and the hydraulic pressure is determined in the servo component or control element by measuring a final test stand or transmission acceptance test stand. This function, which can be presented as a characteristic line, varies from transmission to transmission and, in addition, depends on temperature. When the electronic transmission control has this characteristic line being dependent on the single specimen available as a data set, the specimen-dependent controls can be taken as a lead and thus compensated during the pressure regulation control.

These characteristic quantities or characteristic lines (for example, pressure regulating characteristic lines) are stored or used in an electronic control with adaptive functions to make achieving a uniform shifting or regulation comfort possible. The electronic control is usually integrated in the transmission so that the characteristic quantities can be directly stored in the control.

SUMMARY OF THE INVENTION

Within the scope of new developments in the automobile technology, it has been provided that the electronic control (transmission control), in certain cases, is integrated in the engine control which means that the characteristic quantities of an automatic transmission cannot be directly stored in the control.

The problem on which this invention is based is to provide a method for transferring of the characteristic quantities of the automatic transmission from the final test stand or transmission acceptance test stand or mechatronics to an electronic control, particularly, to the engine control.

BRIEF DESCRIPTION OF THE DRAWINGS

The invention will now be described, by way of example, with reference to the accompanying drawing in which.

DETAILED DESCRIPTION OF THE INVENTION

Figure 1:
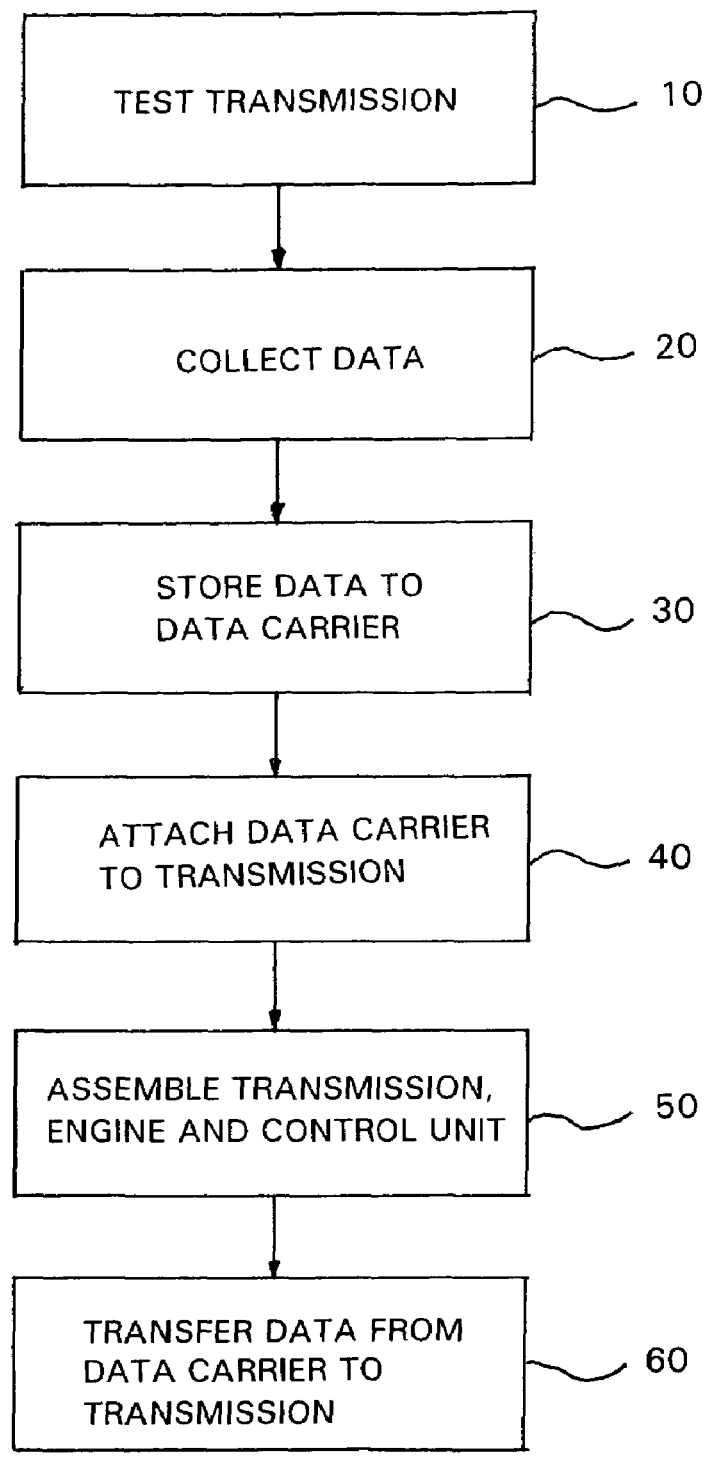
FIG. 1 is a diagram showing an embodiment of the method for transferring transmission characteristics to an electronic control.

It is accordingly proposed to record (at step 20) or store (at step 30) the characteristic quantities or characteristic lines of the automatic transmission from the final test stand (at step 10) or transmission acceptance test stand (at step 10) on a portable data carrier clearly coordinated with a transmission so that at a later point in time, such as when the transmission has been assembled with the engine and the engine control (at step 50), said data can be read into and programmed in the engine control (at step 60).

The portable data carrier can preferably be a magnetic strip, a chip card, a bar code, a memory card, or any other suitable storage device. This can be, for example, fastened on the transmission (at step 40) so as to prevent changes prior to the transfer of the data to the engine control (at step 60).

The invention claimed is:

1. A method of transfer of characteristic quantities or characteristic lines of an automatic transmission from a final test stand or transmission acceptance test stand, or mechatronics to an electronic control, comprising the steps of:
   recording data comprising at least one of the characteristic quantities or the characteristic lines of the final test stand or transmission acceptance test stand;
   storing the recorded data on a portable data carrier coordinated with the transmission;
   at a later point in time, programming the engine control with the recorded data transferred from the portable data carrier; and
   utilizing the recorded data, transferred from the portable data carrier to the engine control, to control the automatic transmission during operation thereof.

2. The method according to claim 1, further comprising the step of using, as the portable data carrier, one of a magnetic strip, a chip card, a bar code, a memory card, or any other suitable storage device that can be fastened on the transmission.

3. The method according to claim 1, further comprising the step of, after storing the data pertaining to the at least one characteristic quantity and the characteristic line in the portable data carrier, securing the protable data carrier to the transmission;
   employing one of a magnetic strip, a chip card, a bar code and a memory card as the portable data carrier;
   connecting the transmission with an engine and an engine control before transferring the data, pertaining to the at least characteristic quantity and the characteristic line, from the portable data carrier to the electronic control; and
   employing the engine control as the electronic control.

4. A method for transferring data comprising at least one of a characteristic quantity and a characteristic line of a transmission, generated during final testing of the transmission, to an electronic control of the transmission, the method comprising the steps of:
   collecting, during the final testing of the transmission, the data comprising at least one of the characteristic quantity and the characteristic line;
   storing the data comprising at least one of the characteristic quantity and the characteristic line collected during the final test of the transmission on a portable data carrier coordinated with the transmission; and
   at a later point in time, transferring the stored data comprising the at least one of the characteristic quantity and the characteristic line from the portable data carrier, coordinated with the transmission, into the electronic control for subsequent use in controlling operation of the transmission.

5. The method according to claim 4, further comprising the step of using one of:
   a magnetic strip to be secured to the transmission,
   a chip card to be secured to the transmission,
   a bar code to be secured to the transmission, a memory card to be secured to the transmission, and a storage device to be secured to the transmission as the portable data carrier.

6. The method according to claim 4, further comprising the step of using an engine control as the electronic control.

7. The method according to claim 4, further comprising the step of, after storing the data pertaining to the at least one characteristic quantity and the characteristic line in the portable data carrier, securing the protable data carrier to the transmission;

employing one of a magnetic strip, a chip card, a bar code and a memory card as the portable data carrier;

connecting the transmission with an engine and an engine control before transferring the data, pertaining to the at least characteristic quantity and the characteristic line, from the portable data carrier to the electronic control; and employing the engine control as the electronic control.

8. A method of transferring at least one characteristic quantity and characteristic line of a transmission, generated during testing of the transmission, to an electronic control, the method comprising the steps of:

testing the transmission for the at least one characteristic quantity and the characteristic line and acquiring data pertaining to the at least one characteristic quantity and the characteristic line;

storing the data pertaining to the at least one characteristic quantity and the characteristic line of the transmission in a data carrier;

coordinating the data carrier with the tested transmission so that the data carrier is transported along with the transmission to a further assembly area; and at the further assembly area, transferring the data pertaining to the at least one characteristic quantity and the characteristic line of the transmission from the data carrier to the electronic control for use in controlling operation of the transmission.

9. The method according to claim 8, further comprising the step of testing the transmission in at least one of a final test stand, a transmission acceptance test stand and a mechatronics test stand.

10. The method according to claim 9, further comprising the step of, after storing the data pertaining to the at least one characteristic quantity and the characteristic line in the data carrier, securing the data carrier to the transmission; and employing one of a magnetic strip, a chip card, a bar code and a memory card as the data carrier.

11. The method according to claim 10, further comprising the steps of connecting the transmission with an engine and an engine control before transferring the data, pertaining to the at least characteristic quantity and the characteristic line, to the electronic control and employing the engine control as the electronic control.

* * * * *